April 5, 1960  R. W. MORLING  2,931,664
FLEXIBLE VEHICLE FRAMEWORK AND RUNNING GEAR
Filed March 26, 1958  3 Sheets-Sheet 1
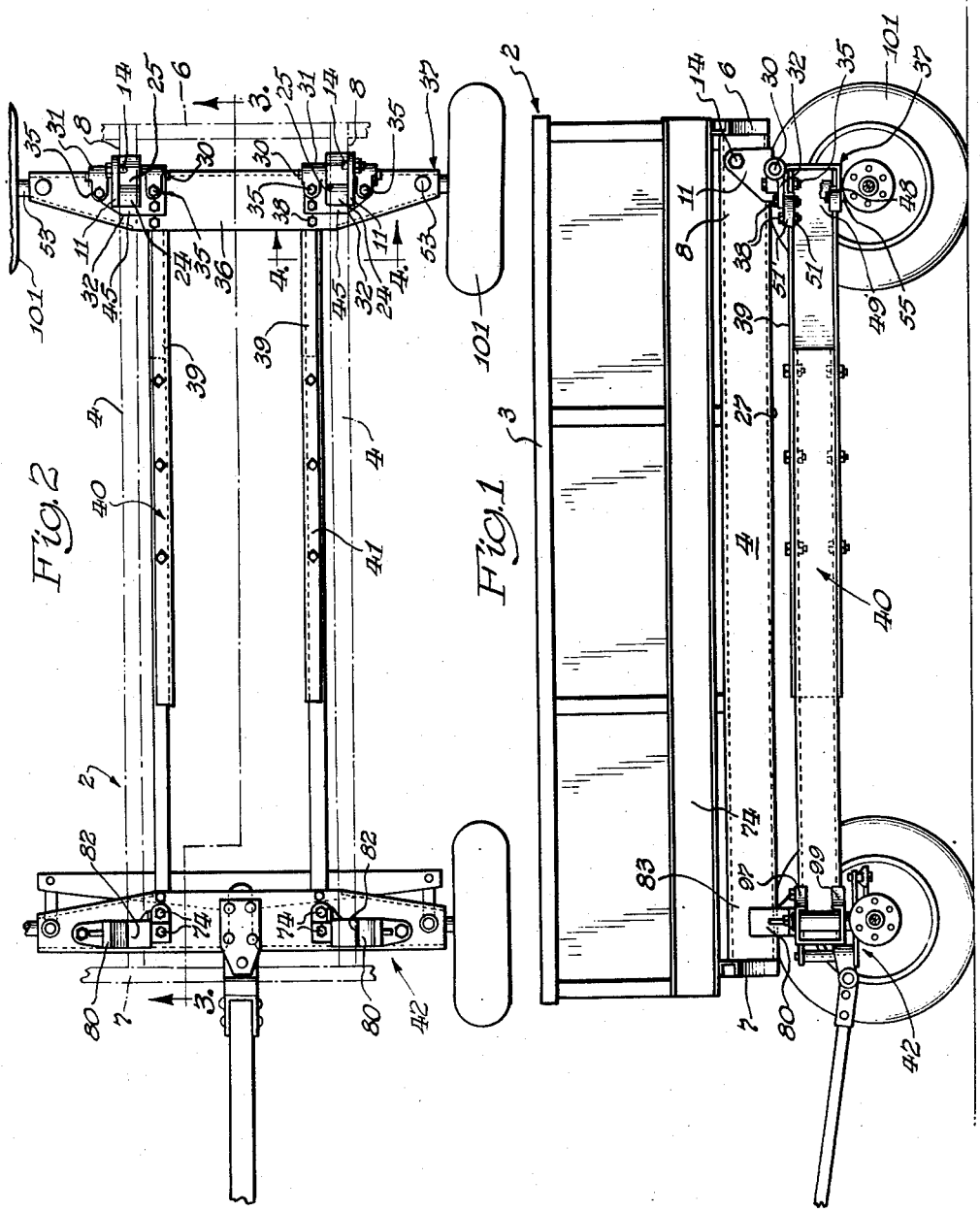
Inventor
Roy W. Morling
Attorney April 5, 1960
R. W. MORLING
2,931,664
FLEXIBLE VEHICLE FRAMEWORK AND RUNNING GEAR
Filed March 26, 1958
3 Sheets-Sheet 2
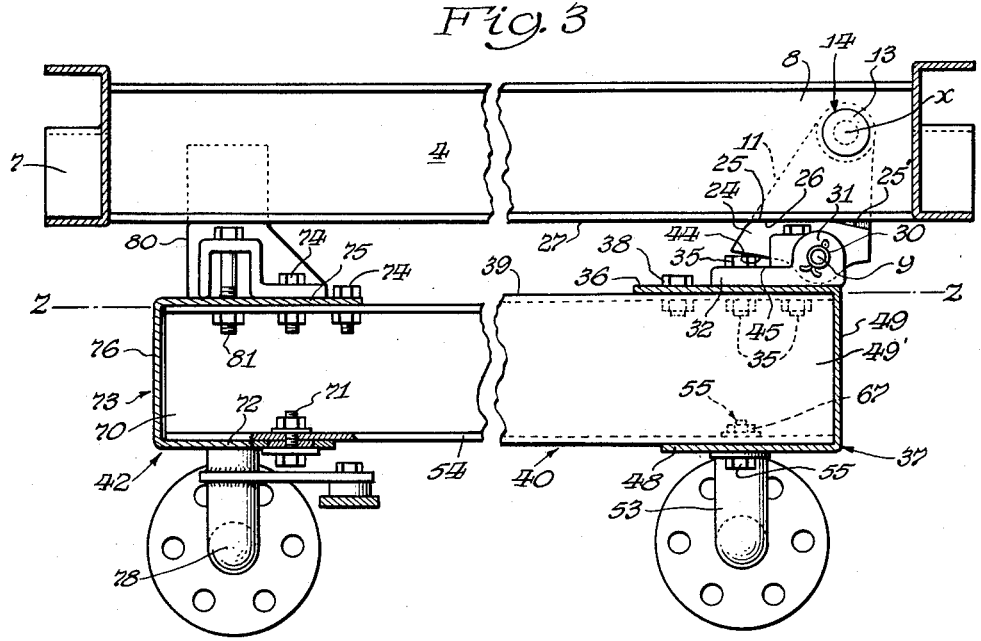
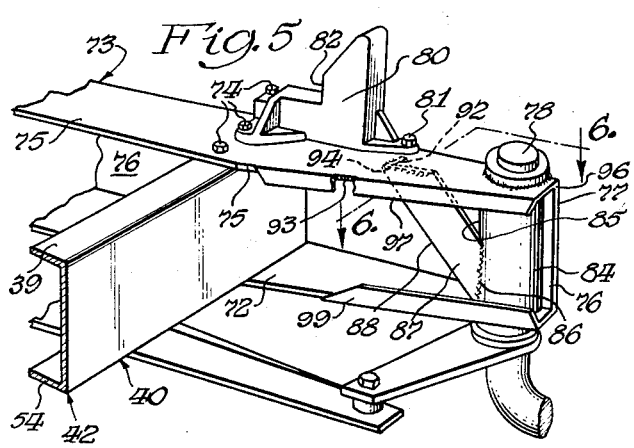
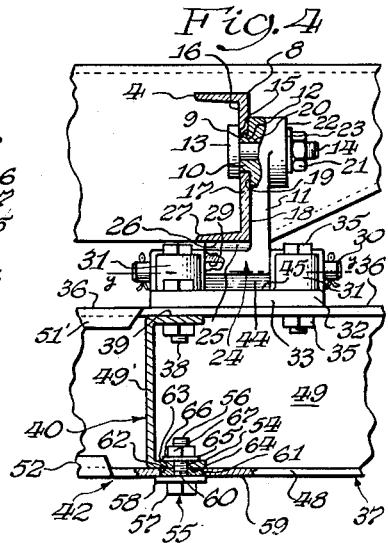
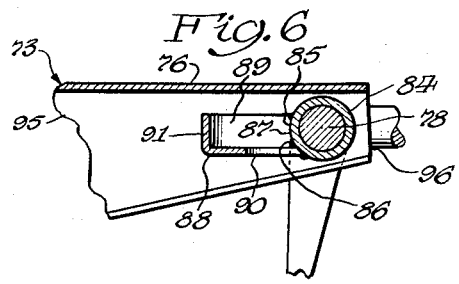
Inventor
Roy W. Morling
Paul O. Pippel
Attorney

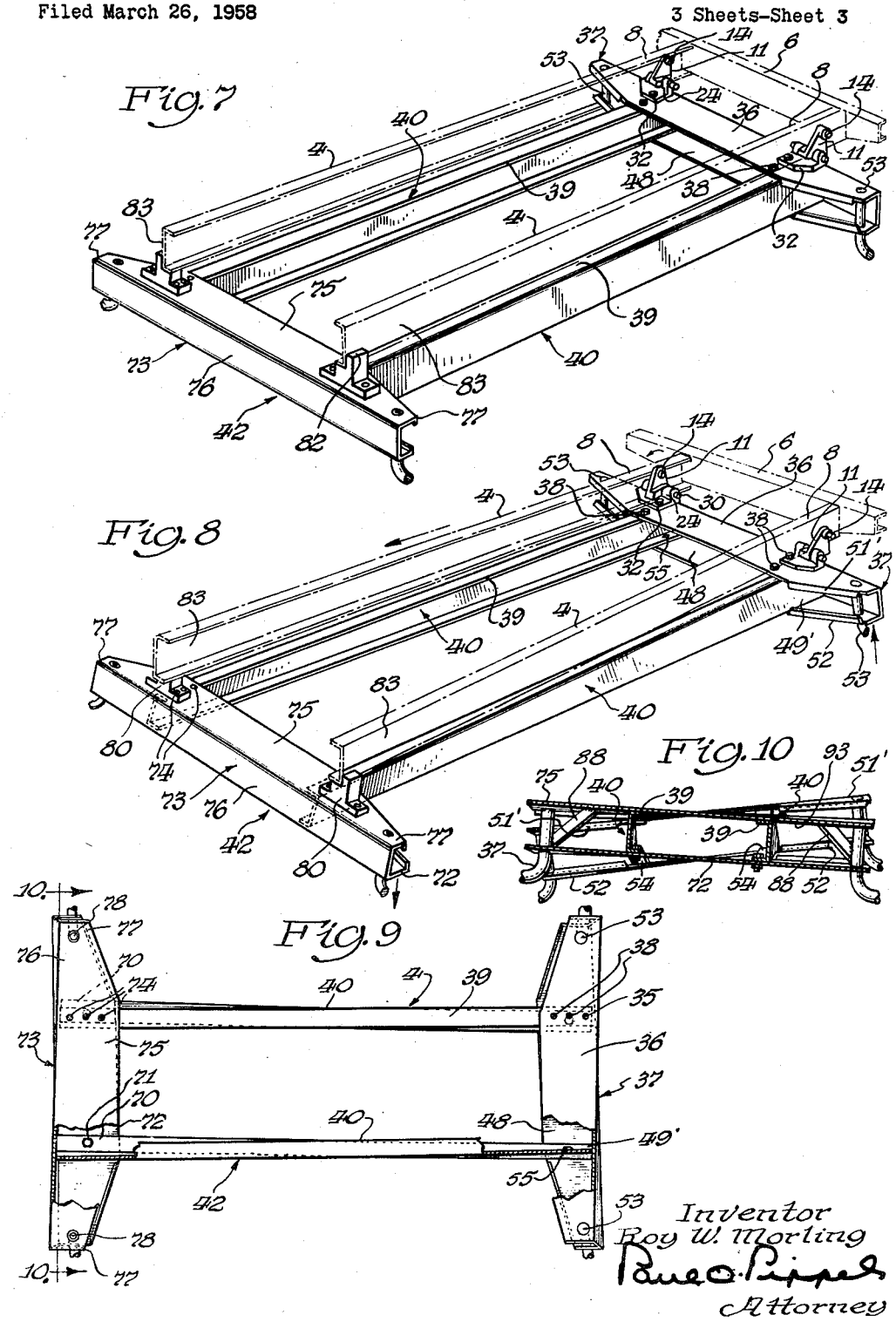

United States Patent Office 2,931,664
Patented Apr. 5, 1960

2,931,664

FLEXIBLE VEHICLE FRAMEWORK AND RUNNING GEAR

Roy W. Morling, Galesburg, Ill., assignor to International Harvester Company, Chicago, Ill., a corporation of New Jersey Application March 26, 1958, Serial No. 724,170

15 Claims. (Cl. 280—106)

This invention relates to vehicle running gears and more particularly to a novel running gear which is adapted to flex as the vehicle passes over uneven terrain in order to adequately support the load and which is rugged and long-lived in service.

The general object of the invention is to provide a novel running gear which incorporates front and rear transverse bolsters mounting wheels at opposite ends, the bolsters being interconnected by laterally spaced side sills. This combination is adapted to flex in torsion to accommodate twisting of the wagon about a longitudinal neutral axis.

In wagons under consideration there is normally provided atop the running gear a material hauling box and this box is normally pivotally mounted on the rear bolster and at its front end is confined between a pair of upright guides carried by the front bolster. I have discovered that in such a construction because the rear end of the box is carried by rigid pivots, that the front of the box tends to move laterally as the front and rear axles move or swing up and down about the fore and aft neutral axis, tremendous side thrusts are developed on the front of the box against the guides or stops on the front bolster to such an extent that the side members of the box are bent or destroyed. Furthermore, excessive strains are placed on the hinges which fail early.

In view of the foregoing observations, it is an object of this invention to relieve such stresses by providing a double pivot hinge of novel construction to redirect the movement of the box from a lateral thrust at the front to more or less a fore and aft movement at the rear.

A further object of the invention is to provide a novel connection between the side rails and the front and rear bolsters such that during twisting of the bolsters certain members thereof will have pivotal movement with respect to the side rails to which they are attached in order to further accommodate the stresses developed which I had found that in rigid constructions would rupture and fatigue the side rails in previous applications.

A still further object of the invention is to provide a novel construction of the end portions of the front bolster which carry the steering wheels in order to control the flexure of these end portions and to transfer the deflection into areas designed to accommodate the same.

These and other objects of the invention will become more apparent from the specification and the drawings, wherein:

Figure 1 is a side elevational view of the wagon with the wheels in the foreground removed;

Figure 2 is a plan view of the novel running gear showing the box underframe in phantom lines;

Figure 3 is a fore-shortened enlarged broken apart longitudinal sectional view taken substantially on the line 3—3 of Figure 2;

Figure 4 is an enlarged transverse vertical sectional view taken substantially on the line 4—4 of Figure 2;

Figure 5 is a perspective view of an end portion of the front bolster;

Figure 6 is a transverse vertical sectional view taken substantially on the line 6—6 of Figure 5;

Figure 7 is a perspective view of the running gear frame and wagon box underframe shown in phantom lines illustrating the position of the parts under static conditions;

Figure 8 is an illustration similar to Figure 7 but illustrating the parts under a condition of twisting of the running gear;

Figure 9 is a plan view illustrating the running gear in a twisted position and parts being broken away and shown in horizontal section; and Figure 10 is a transverse vertical sectional view taken substantially on the line 10—10 of Figure 9.

Describing the invention in detail and having particular reference to the drawings, there is shown a wagon generally designated 2 which comprises a box 3 of usual rectangular form, the box having an underframe including a pair of side rails 4 and 4 interconnecting end rails 6 and 7 which are rigidly attached to the box as by welding or bolting or the like.

The rear end portions 8 of the side rails 4 are each provided on their median line with a horizontal pivot opening 9 through which extends a boss 10 of a hinge member 11, the boss having peripheral engagement as at 12 (Figure 4) with the margin of the opening 9 and on its inboard side providing a seat for the head 13 of a bolt 14, the head 13 bearing as at 15 against the inboard side 16 of the vertical web 17 of the end portion 8 of the related side member 4. The outboard side 18 of the web 16 is engaged by a shoulder 19. The bolt 14 has its shank passing through an opening 20 in the boss and the outboard end of the bolt is threaded and has a nut 21 thereon which engages the outboard end 22 of the boss through a washer 23. Thus the box is afforded a first pivot from the first or upper hinge part 11 which at its lower end and inner side is provided with a laterally inwardly extending saddle portion 24 which is provided with a top surface 25 which bears and affords a seat for the flat bottom side 26 of the bottom inwardly extending flange 27 of the channel-shaped side member 4. Thus the bottom flange 27 has a limit stop seat on the saddle portion 24 and the saddle portion is provided with a generally horizontal transverse opening 29 generally parallel to the opening 20 through which extends a pin or pintle 30 providing a second pivot for the upper hinge part 11.

The pin 30 extends through and is secured to upwardly extending ears 31 in a lower hinge part 32, the base 33 of which is secured as by bolts 35 to a top web 36 of the U-shaped or channel-shaped rear bolster member generally designated 37 of the wagon running gear. The base web 33 is also secured by at least two other sets of bolts 38 in addition to one bolt 35 to said top web 36 of the rear axle beam 37 and to the top flange 39 of the adjacent side sill 40 of the wagon running gear generally designated 42. It will be seen from a consideration of Figure 3 that the axis of pivot indicated at X of the upper pivot of the bolt 14 is disposed rearwardly of the center of pivot Y of the pin 30 and this relationship is maintained in normal operation by means of a stop surface 44 which is formed on the underside saddle 24 for abutment with the top side 45 of the base 32 so that if and when the box moves forwardly as the upper hinge portion 11 rotates in a counterclockwise direction the movement will terminate short of the dead center positions or vertical alignment of the axes X and Y and the axis X is always maintained rearwardly of the axis Y. The arcuate surface 25' is provided to stop the forward movement of X when the box is in the hoisted position should there be any abnormal condition to cause one side to go forward when hoisted, Surface 25' is located to provide stop action at the same point as surface 44 when the box is in normal position.

It will be noted that the hinges accommodate fore and aft movement of the box for a limited extent for a purpose hereinafter described.

The rear channel or U-section axle bolster in addition to the top wall 36 comprises a bottom wall or web 48 and the rear web 49, the webs 36 and 48 embracing the adjacent end portion 49' of the pair of laterally spaced channel-shaped side sills 40 of the running gear. As heretofore explained, the top flange 39 is secured by longitudinally spaced bolts 35 and 38 to the top web 37 of the rear bolster and to the bottom mounting portion 33 of the hinge and maintain the frame squared.

The end portions of the rear axle beam are flanged at 51' and 52 in order to rigidify the end portions and each of the end portions mounts a wheel spindle 53 as set forth in U.S. Patent 2,801,863, issued August 6, 1957.

By tightly bolting the upper flange 39 to the upper flange 37 of the rear bolster the running gear is rigidified in its upper side which forms the neutral axis Z—Z (Fig. 3) of the running gear assembly about which longitudinal twisting takes place.

As best seen in Figures 7 through 10, the side sills 40 are subjected to torsional loads and deflect in twist as shown. I have found that in order to accommodate this twist without fatiguing and fracturing the connections of these side sills with the bolsters it is absolutely necessary to pivot one of the flanges of the sill preferably the lower flange 54 of each sill member 40 about a substantially vertical axis and this is accomplished by providing a single bolt connection or pivotal connection generally designated 55 and this pivotal connection includes a bolt 56 (Fig. 4) which is substantially centered on the end portions 49' of each sill, the bolt having a head 57 which abuts through a washer 58 against the underside 59 of the bottom web 48. The bolt is located substantially on the intersection of the median lines of flanges or portions 48, 54. The head is on the lower end of a shank 60 which passes through a spacer 61 which fits into a complementary opening 62 in the bottom flange 48, the washer 62 being of approximately the same thickness as the flange 48 and on its top side seating as at 63 against the underside 64 of the bottom flange 54, the shank 60 passing through an opening 65 in the flange 54 and mounting a washer 66 which is pressed against the top side of the flange 54 by means of a nut 67 which is threaded on the upper end of the shank 60.

Similarly the forward end portions 70 of the side sills 40 are connected by single bolts 71 to the bottom flange 72 of the front bolster 73 and by three bolts 74 to the top flange 75 of the front bolster 73, the front bolster being a channel or U-section member and the top and bottom flanges 75 and 72 being interconnected by a vertical front wall 76. The end portions 77 of the front bolster mount the wheel supporting spindles 78 as discussed in the previously mentioned Patent 2,801,863. The top side of the flange 75 of the front bolster mounts the confining saddles or stops or guides 80 which are secured to the bolster by means of two of the bolts 74, the stops being additionally secured by bolt 81 to web 75. It will be noted that the stops provide vertical side surfaces 82 which engage the outboard sides 83 of the side rails 4 of the box adjacent to their forward ends.

The end portions 77 are provided with the vertical sleeves or spindle holders 84 which extend through and are welded to the top and bottom flanges 75 and 72 of the front bolster, these sleeves 84 being located adjacent to the outer extremities of the end portions 77 and at their lower inboard sides 85 above the top web 72 are connected as by welding at 86 to the lower end 87 of a diagonal upwardly and inwardly extending strap or brace member 88 which is L-shape in section and comprises a rear flange 90 and a bottom web 91, the member 88 extending diagonally upwardly and inwardly and having a diagonally sheared upper end 92 which seats against the underside 93 of the top web 75 of the end portion 77 and is weld connected thereto as at 94. The upper extremity of member 88 is disposed substantially medially between the inboard and outboard extremities 95 and 96 of the related end portion and substantially medially between the wall 76 and the dependent flange 97 on the diagonal outwardly converging rear edge of the end portion. This position is then through the neutral axis of the bolster. It will also be noted that the bottom flange 72 of the end portion is provided with an upstanding flange 99 which is also located along a diagonal edge which converges outwardly with the front wall 76 of the front bolster.

The wheel supporting spindles 53 of the rear wheels 101 are connected to the rear bolster as described in the beforementioned patent. In operation I have found from an actual construction and actual operation that I have provided a flexible running gear which follows terrain conditions and in which the parts are so arranged to accommodate the flexing without unduly stressing any area. I have found that by providing the double jointed hinges with the saddles that during twisting of the side sills, as best seen in Figures 7 through 10, the box is guided between the forward guards 80 and moves forwardly on one side or the other which is allowed by one of the rear hinges rocking forward. One of either of the hinges will rock forward depending on the direction the frame is twisted, during such twisting action without imposing the severe side drafts which have heretofore developed in conventional constructions which use a single pivot hinge and caused the side rails 4 to be bent inwardly and deformed.

I have also found that by providing a single bolt connection between one of the flanges of the side rails and the engaging flange of the related bolster and by rigidly securing at least two or more bolts of the other flange of each side rail to the other flange of the related bolster that I maintain the running gear square and at the same time the pivoting flange is accommodated lateral pivotal movement about a vertical axis in one direction when the frame is twisted in one way and in the opposite direction when the frame is twisted the other way, i.e. upwardly or downwardly, and thus the connections of the end portions of the side sills to the bolsters are relieved of the high stresses which were incidental to constructions heretofore used where both the top and bottom flanges of each side sill were rigidly connected to the top and bottom flanges of the axle bolsters in an attempt to maintain the box for the running gear squared.

I have further found that by placing the diagonal reinforcing struts in the end portions of the front bolster as I have described that I have greatly improved the rigidity of these end portions against deflection so that I can maintain steering stability even under the most adverse terrain conditions and have redirected the loads into areas designed to deflect and accommodate such loading.

What is claimed is:

1. In a vehicle running gear, a pair of laterally spaced channel side sill members having top and bottom webs and a vertical wall therebetween, transverse front and rear channel bolsters having top and bottom webs and a vertical wall therebetween, the webs of the bolsters embracing the webs of the sills, fixed connections between the top webs of the bolsters and the top webs of the sills, and pivotal connections between the bottom webs of the bolsters and the bottom webs of the sills.

2. The combination of a torsionally flexible running gear including a pair of laterally spaced side sills and interconnecting front and rear bolsters, a wagon box frame supported upon the gear and including a longitudinal structure, laterally spaced hinge means mounted upon said rear bolster, said hinge means including first pivot means pivotally connected to said structure on a transverse axis and second pivot means pivotally connected to said running gear, and said hinge means including first and second members articulated about said second pivot means and having abutments engageable to limit pivotal movement of said members in an arc rearwardly of the dead center position of the first pivot means with respect to the second pivot means, and guide means on the structure engaging said frame for guiding the frame fore and aft during flexing of the running gear with attendant pivoting of said hinge means about both of said axes.

3. The invention according to claim 2 and a saddle on said first member having a seating surface and said frame having a surface seated thereon for rockable movement with respect thereto.

4. In a vehicle running gear, a pair of laterally spaced U-section sills and a U-section bolster, said sills and bolster having vertically spaced webs disposed in overlapped relation, means rigidly interconnecting one of the webs of each sill to the corresponding web of the bolster, and means pivotally connecting the other of the webs of the sills and corresponding web of the bolster on a transverse axis.

5. In a vehicle running gear, a rectangular framework comprising a pair of laterally spaced side sills and a front and rear transverse bolster, said sills and bolsters having top and bottom portions with respective portions in engagement, means rigidly interconnecting said top portions to maintain the framework square, means pivotally interconnecting respective bottom portions on generally vertical axes to accommodate longitudinal torsional twisting of the sills and bolsters, hinge means mounted on the rear bolster comprising first and second parts, the first part connected to the rear bolster, means pivotally interconnecting the parts on a first horizontal transverse axis, a box frame superposed with respect to the framework, a second pivotal connection on a second generally horizontal axis between the second part and the box frame, abutment means for limiting swinging movement of said parts so that said second axis is maintained rearwardly of the first, wheel means mounted on the ends of said bolsters, and brace means rigidly connected between the top and bottom portions of at least one bolster and extending diagonally upwardly and inwardly from the point of connection therewith of said wheel means toward the connections of the top portions thereof with the side sill. bedfith 6. In a flexible vehicle running gear comprising a bolster having top and bottom flanges and an interconnecting vertical wall, a side sill having top and bottom flanges and a vertical wall therebetween, means rigidly connecting certain of the corresponding flanges of the sill and bolster to maintain the same squared, and a single transverse pivotal connection between the other of the corresponding flanges of the bolster and sill and disposed substantially at the intersection of the longitudinal medial lines thereof.

7. In a flexible vehicle running gear, a generally rectangular frame torsionally flexible about a fore and aft longitudinal axis and having front and rear portions, a pair of hinges spaced laterally on the rear portion and having a first part connected to the rear portion and a second part pivotally connected to the first on a first horizontal transverse axis and said second part having second pivot means adapted for pivotal connection to an associated vehicle box on a second transverse generally horizontal axis, and a laterally extending saddle on said second part having an upwardly convexed seat for said box and oriented about said first axis.

8. The invention according to claim 7 and said parts having abutment surfaces engageable to prevent said second part swinging forwardly past dead center position of said axes.

9. A wheel supporting structure in a wagon running gear comprising laterally spaced longitudinal side sills and a bolster interconnecting said side sills and having end portions projected outwardly of said side sills, each end portion having spaced top and bottom web portions and an intervening vertical wall portion integral with said web portions, wheel mounting means comprising a vertical member extending through said web portions and connected thereto, and brace means between the web portions and extending diagonally upwardly inwardly from the lower end of the mounting means to the upper web portion and integrally connected thereto, and said mounting means including a sleeve, and said brace means being an angle having an upwardly extending flange and a transverse wall and said flange directed vertically.

10. In a vehicle running gear, a frame comprising transverse front and rear channel axle beams, a pair of laterally spaced fore and aft channel side sills, each of said sills and beams having vertically spaced top and bottom webs and an interconnecting vertical wall, means rigidly connecting certain of the webs of the sills to certain of the webs of the bolsters for maintaining the frame square, and means pivotally connecting the other of the webs of the sills and beams on a vertical axis to accommodate pivotal movement therebetween during torsional flexing of said frame.

11. The invention according to claim 10 and said pivot means located substantially at the intersections of the median planes of said bolsters and side sills.

12. A vehicle running gear comprising a transverse bolster and a fore and aft sill member, each including top and bottom webs and an intervening vertical wall, means pivotally interconnecting the bottom webs of the sill and bolster on a generally vertical axis, means rigidly interconnecting the top webs of the bolster and sill to maintain them squared, said bolster having an end portion extending outwardly of the sill, vertical wheel mounting means on the end portion having a lower part connected to the bottom web and an upper part connected to the top web, and a diagonal brace element having a lower end connected to the lower part of the wheel mounting means and having an upper end connected to the top web of the bolster close to its rigid connection to the top web of the sill.

13. A vehicle running gear according to claim 12 and said webs of the end portions having vertically directed flanges converging with said wall of the bolster toward the adjacent outer end thereof.

14. In a vehicle running gear, a pair of laterally spaced fore and aft extending channel side sills and channel transverse front and rear bolsters, said sills and bolsters having top and bottom webs and means pivotally interconnecting certain webs of the bolsters and side sills for pivotal movement on substantially vertical axes and other means rigidly interconnecting other webs of the bolsters and side sills.

15. A vehicle running gear comprising front and rear bolsters, and a flexible frame structure interconnecting the bolsters for vertical movement about a longitudinal axis of the running gear, said bolsters having vertically spaced portions, said frame having fixed connections with certain of said bolster portions for maintaining the running gear squared and having pivotal connections with the other portions for accommodating torsional deflection between the frame and bolsters.

References Cited in the file of this patent
UNITED STATES PATENTS

| | | |
|---|---|---|
| 646,081 | Sperry | Mar. 27, 1900 |
| 2,636,750 | Vahey | Apr. 28, 1953 |
| 2,801,864 | Raney | Aug. 6, 1957 |